(12) United States Patent
Aoki et al.

(10) Patent No.: US 7,487,108 B2
(45) Date of Patent: Feb. 3, 2009

(54) VEHICLE COLLECTED FEE DISTRIBUTING SYSTEM

(75) Inventors: Yasuyuki Aoki, Nagoya (JP); Masaki Kakihara, Yokohama (JP)

(73) Assignees: Aisin Seiki Kabushiki Kaisha, Aichi (JP); Toyota Jidosha Kabushiki Kaisha, Aichi (JP)

( * ) Notice: Subject to any disclaimer, the term of this patent is extended or adjusted under 35 U.S.C. 154(b) by 619 days.

(21) Appl. No.: 10/381,660

(22) PCT Filed: Sep. 28, 2001

(86) PCT No.: PCT/JP01/08505

§ 371 (c)(1),
(2), (4) Date: Jun. 25, 2003

(87) PCT Pub. No.: WO02/29730

PCT Pub. Date: Apr. 11, 2002

(65) Prior Publication Data

US 2004/0024664 A1     Feb. 5, 2004

(30) Foreign Application Priority Data

Sep. 29, 2000   (JP)   ............................. 2000-299978

(51) Int. Cl.
*G07B 15/00* (2006.01)
*G07B 15/02* (2006.01)
*G08G 1/00* (2006.01)
*G08G 1/065* (2006.01)

(52) U.S. Cl. ....................................... 705/13; 340/928

(58) Field of Classification Search .............. 379/93.12; 235/381, 380; 902/22, 24, 30, 31
See application file for complete search history.

(56) References Cited

U.S. PATENT DOCUMENTS 5,767,505 A * 6/1998 Mertens et al. ............. 235/61 S (Continued)

FOREIGN PATENT DOCUMENTS

CA     2 340 137 A1     8/1999

(Continued)

OTHER PUBLICATIONS

"Electronic payment plan offers convenience for motorists and commuters", BusinessWorld; Jul. 23, 1999; p. 25.*

(Continued)

*Primary Examiner*—F. Zeender
*Assistant Examiner*—Mussa Shaawat
(74) *Attorney, Agent, or Firm*—Pillsbury Winthrop Shaw Pittman LLP

(57) ABSTRACT

An on-vehicle automatic charging apparatus 10 obtains its own position information from GPS signals from GPS satellites 51 to 53, determines on the basis of the position information whether conditions for charging are satisfied, and subtracts a calculated charge amount from an inserted prepaid car, when the conditions for charging are satisfied. At this time, information used for calculation of the charge amount is written into the prepaid card as a charge record. When the prepaid card is inserted into a card issuing machine 20 in order to increase the balance, the card issuing machine 20 reads the written charge record and transmits it to a center computer 30. The center computer 30 distributes the charge amount to management companies on the basis of the charge record.

18 Claims, 8 Drawing Sheets

U.S. PATENT DOCUMENTS

| | | | | |
|---|---|---|---|---|
| 5,805,082 | A * | 9/1998 | Hassett | 340/928 |
| 5,812,643 | A * | 9/1998 | Schelberg et al. | 379/93.12 |
| 5,825,007 | A * | 10/1998 | Jesadanont | 235/384 |
| 6,263,316 | B1 * | 7/2001 | Khan et al. | 705/13 |
| 6,344,804 | B1 * | 2/2002 | Koga | 340/928 |
| 6,624,611 | B2 * | 9/2003 | Kirmuss | 320/104 |
| 6,816,707 | B1 * | 11/2004 | Barker et al. | 455/41.2 |
| 7,012,547 | B2 * | 3/2006 | Hassett | 340/928 |
| 7,046,166 | B2 * | 5/2006 | Pedyash et al. | 340/870.07 |
| 7,127,413 | B1 * | 10/2006 | Yanagisawa et al. | 705/13 |
| 7,224,291 | B2 * | 5/2007 | Hassett | 340/928 |
| 2002/0046161 | A1 * | 4/2002 | Matsutani | 705/39 |
| 2003/0067396 | A1 * | 4/2003 | Hassett | 340/825.49 |
| 2006/0145893 | A1 * | 7/2006 | Hassett | 340/928 |

FOREIGN PATENT DOCUMENTS

| | | |
|---|---|---|
| DE | 43 34 152 | 12/1994 |
| DE | 43 34 160 | 12/1994 |
| DE | 198 37 488 | 2/2000 |
| EP | 752688 | 1/1997 |
| EP | 1 050 853 A1 | 11/2000 |
| GB | 2 326 009 | 12/1998 |
| JP | 06-203256 | 7/1994 |
| JP | 7-146960 | 6/1995 |
| JP | 08-297700 | 11/1996 |
| JP | 11-238153 | 8/1999 |
| JP | 2000-163613 | 6/2000 |
| JP | 2001-216380 | 8/2001 |
| KR | 1999-0082835 | 11/1999 |
| KR | 0234810 | 12/1999 |
| WO | 94/28512 | 12/1994 |
| WO | WO 99/38123 | 7/1999 |
| WO | WO 00/22579 | 4/2000 |

OTHER PUBLICATIONS

International Search Report in related application, PCT/JP0108505 dated Feb. 27, 2007, 3 pages.

Office Action issued in corresponding Korean application, dated Jul. 25, 2006.

* cited by examiner

VEHICLE COLLECTED FEE DISTRIBUTING SYSTEM

This application is the National Phase of International Application PCT/JP01/08505 filed Sep. 28, 2001 which designated the U.S. and that International Application.

TECHNICAL FIELD

The present invention relates to a collected-charge distribution system which includes an on-vehicle automatic charging apparatus mounted on a vehicle and a ground terminal apparatus disposed on the ground, and which is adapted to distribute charges collected through the on-vehicle automatic charging apparatus, as well as to the on-vehicle automatic charging apparatus itself and to the ground terminal apparatus itself.

BACKGROUND ART

As disclosed in Japanese Patent Application Laid-Open (kokai) No. 11-238153, there has conventionally been known an on-vehicle automatic charging apparatus which obtains position information representing position of a vehicle by use of, for example, GPS; determines on the basis of the position information whether the vehicle has entered a charged area; when the vehicle is determined to have entered the charged area, calculates a charge amount; and subtracts the calculated charge amount from the balance of a prepaid card, an IC card, or a like card (hereinafter referred to as a "charge card"). An automatic charging system for a vehicle which includes such an on-vehicle automatic charging apparatus is designed in order to enable a user to increase the balance of his charge card by inserting the charge card into a card issuing machine (ground terminal apparatus) placed at an appropriate location on the ground and then placing money into the apparatus.

However, the above-described conventional system involves a problem in that when a manager of a location at which the card issuing machine is disposed differs from a manager of an area (road) in which a charge amount must be subtracted from the card, the manager of the area cannot receive the charge which the manger should normally receive.

DISCLOSURE OF THE INVENTION

The present invention has been accomplished in order to cope with the above-described problems, and the feature of the present invention resides in a collected-charge distribution system, for a vehicle which includes an on-vehicle automatic charging apparatus mounted on a vehicle and a ground terminal apparatus disposed on the ground, and which is adapted to distribute charges collected through (by using) the on-vehicle automatic charging apparatus. The on-vehicle automatic charging apparatus includes holding means for removably holding an information readable, writable recording medium having a balance recorded thereon; charge processing means for calculating a charge amount to be charged to the vehicle on the basis of position information representing the position of the vehicle, reading the balance from the recording medium held by the holding means, subtracting the calculated charge amount from the balance, and writing the subtracted balance into the recording medium; and distribution information write means for writing into the recording medium distribution information which is necessary for specifying the charge amount and a party to which a fee corresponding to the charge amount is to be distributed. The ground terminal apparatus includes holding means for removably holding the recording medium; and distribution information read-out means for reading out the distribution information from the recording medium held by the holding means.

In the on-vehicle automatic charging apparatus, the charge processing means reads the balance recorded on the recording medium, which may be a prepaid card, an IC card, or a like card, subtracts from the balance a charge amount calculated on the basis of vehicle position information to thereby obtain a new balance, and writes the new balance into the recording medium. Further, in the on-vehicle automatic charging apparatus, the distribution information write means writes into the recording medium distribution information which is necessary for specifying the charge amount and a party to which a fee corresponding to the charge amount is to be distributed. Meanwhile, the ground terminal apparatus reads out the distribution information from the recording medium. As a result, the ground terminal apparatus can obtain, via the recording medium, the distribution information which is necessary for specifying the charge amount and a party to which a fee corresponding to the charge amount is to be distributed. Therefore, the ground terminal apparatus can distribute the fee corresponding to the charge amount to a party who must receive the fee.

In this case, the distribution information preferably includes information that the charge processing means used in order to calculate the charge amount.

The information that has been required for calculating the charge amount refers to information which includes information sufficient to specify the charge amount and a party to which a fee corresponding to the charge amount is to be distributed and which has been used by the charge processing means. By virtue of the above-described configuration, the on-vehicle automatic charging apparatus is not required to prepare new information as the distribution information, and thus, the calculation load of the apparatus can be reduced.

Preferably, the system includes a computer which is connected to a plurality of ground terminal apparatuses in a communicatable manner; and each of the ground terminal apparatuses includes transmission means for transmitting to the computer the distribution information read out from the recording medium.

By virtue of the above configuration, the distribution information is transmitted to the computer disposed at, for example, a centralized management center, and therefore, the computer can distribute proper amounts to the appropriate parties.

In this case, the charge processing means of the on-vehicle automatic charging apparatus is preferably configured to read out from the recording medium the charge information used for determining the charge amount and determine the charge amount with reference to the charge information; and the ground terminal apparatus preferably includes charge information write means for writing the charge information into the recording medium held by the holding means. The expression "read out from the recording medium the charge information used for determining the charge amount and determine the charge amount with reference to the charge information" encompasses an operation of reading the charge information from the recording medium, temporarily storing the charge information in the memory of the on-vehicle automatic charging apparatus, and reading the charge information from the memory during calculation of the charge amount in order to refer to the same.

The charge information is changed frequently, and therefore the on-vehicle automatic charging apparatus must be caused to recognize the charge information by use of some medium. When the above-described configuration is employed, the charge information can be provided to the on-vehicle automatic charging apparatus by means of the recording medium. In addition, with the above-described configuration, since a user must cause the recording medium to be held by the ground terminal apparatus in order to obtain the charge information, the ground terminal apparatus can obtain the distribution information during such operation.

Further, in this case, the ground terminal apparatus preferably includes balance changing means for changing the balance of the recording medium held by the holding means.

Since this configuration requires the user to cause the recording medium to be held by the ground terminal apparatus in order to increase the balance of the recording medium, the ground terminal apparatus can obtain the distribution information during such operation.

Other features of the present invention resides in the on-vehicle automatic charging apparatus and the ground terminal apparatus which constitute the above-described system.

While referring to the drawings, there will be described one embodiment of the collected-charge distribution system (charging system for a vehicle) according to the present invention, which is adapted to distribute charges collected by the on-vehicle automatic charging apparatus.

BEST MODE FOR CARRYING OUT THE INVENTION

Figure 1:
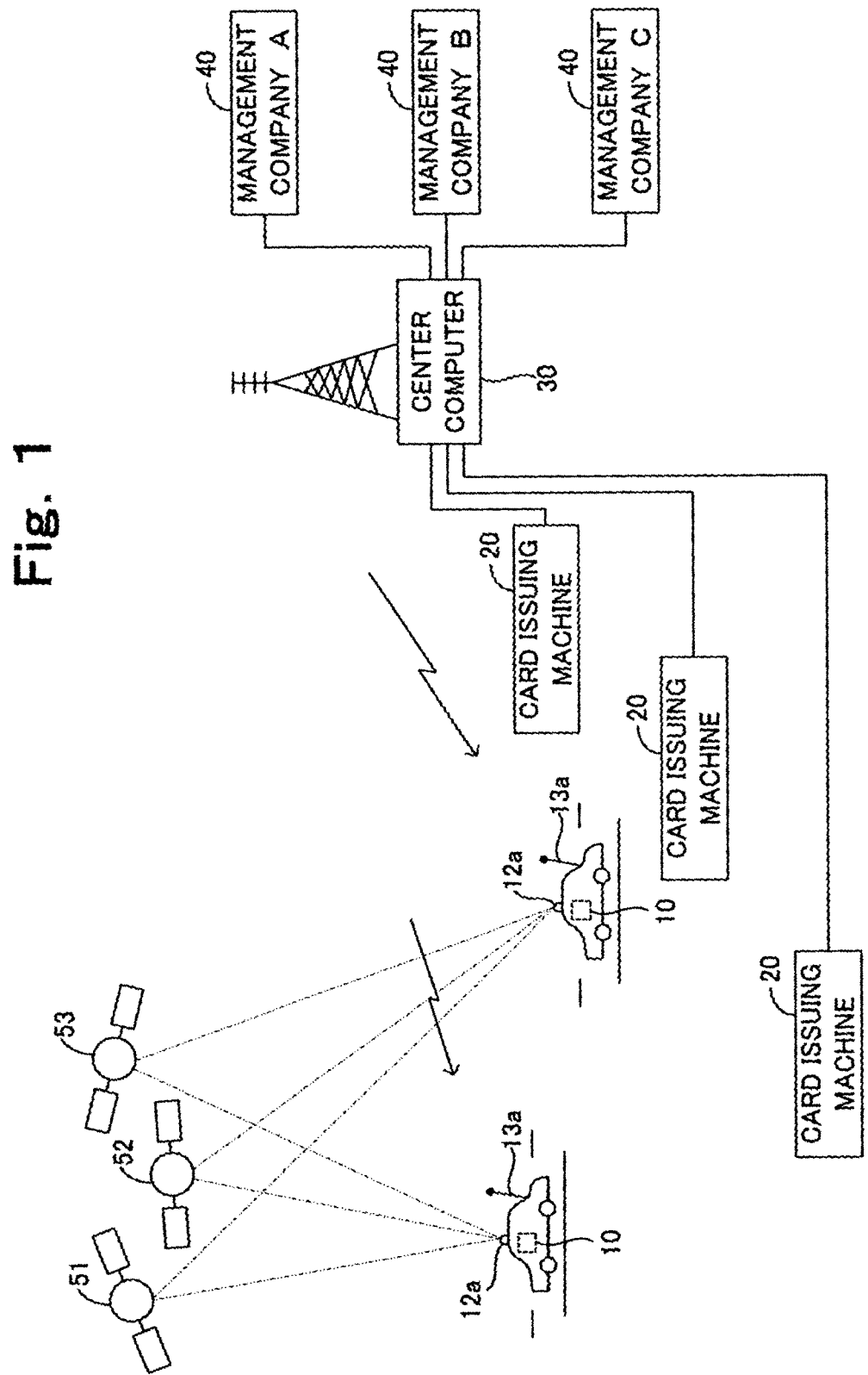
FIG. 1 is a conceptual view showing the entirety of a collected-charge distribution system according to the present invention.

FIG. 1 is a conceptual view showing the entire configuration of a collected-charge distribution system for a vehicle according to the present invention. The system includes an on-vehicle automatic charging apparatus 10 mounted on each vehicle; card issuing machines 20 each of which is disposed at an appropriate location (e.g., a gas station or a convenience store) on the ground and serves as a ground terminal apparatus; a center computer 30 connected to the card issuing machines 20 in a communicatable manner; and computers 40 of a plurality of management companies (managers) which are connected to the center computer 30 in a communicatable manner.

Figure 2:
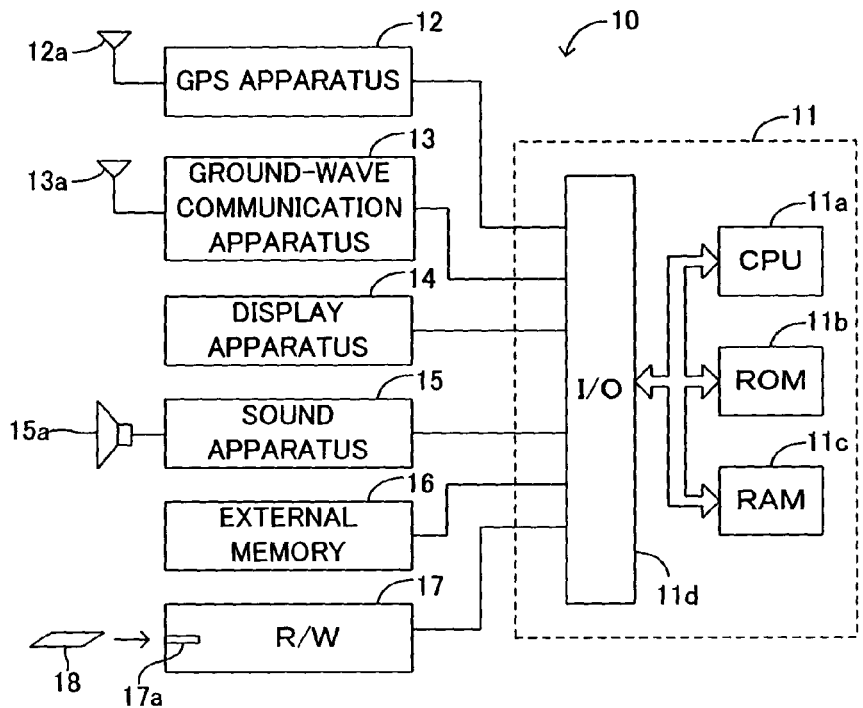
FIG. 2 is a block diagram showing the configuration of the on-vehicle automatic charging apparatus shown in FIG. 1.

As shown in FIG. 2, the on-vehicle automatic charging apparatus 10 is mainly composed of a microcomputer 11. The microcomputer 11 includes a CPU 11$a$, ROM 11$b$, RAM 11$c$, and an input/output interface 11$d$, which are connected with one another via a bus. The CPU 11$a$ executes a program (routine) stored in the ROM 11$b$, which will be described later, while using the data storage function of the RAM 11$c$.

The on-vehicle automatic charging apparatus 10 includes a GPS apparatus 12, a ground-wave communication apparatus 13, a display apparatus 14, a sound apparatus 15, an external memory 16, and a read/write apparatus 17, which are connected to the input/output interface 11$d$ in such a manner so as to be able to exchange signals with the microcomputer 11.

The GPS apparatus 12 is connected to an antenna 12$a$ for receiving GPS signals from GPS satellites 51, 52, and 53 shown in FIG. 1. The GPS apparatus 12 specifies the position of the vehicle on the basis of the GPS signals which are received by the antenna 12$a$ at predetermined intervals (e.g., 1 sec). Subsequently, the GPS apparatus 12 transmits to the microcomputer 11 data (vehicle position information) representing the thus-specified vehicle position. Notably, the vehicle position is determined by longitude x and latitude y.

The communication apparatus 13 is connected to an antenna 13$a$ for ground waves and adapted to receive radio signals from the center computer 30 shown in FIG. 1. The display apparatus 14 includes an unillustrated display and is adapted to display necessary information in accordance with an instruction signal from the microcomputer 11. The sound apparatus 15 is connected to a speaker 15$a$ and is adapted to generate necessary sound in accordance with an instruction from the microcomputer 11.

The external memory 16 is composed of a hard disk drive, MO, etc. and is adapted to supply necessary information (data, program, etc.) to the microcomputer 11 and stores necessary information in accordance with an instruction from the CPU 11$a$. The read/write apparatus 17 includes card holding means 17$a$ for removably holding a prepaid card 18 attached thereto or inserted therein, which serves as a recording medium from which information can be read and into which information can be written. In accordance with instructions from the microcomputer 11, the read/write apparatus 17 reads necessary information, such as balance information, from the inserted prepaid card 18 and writes necessary information into the prepaid card 18.

Figure 3:
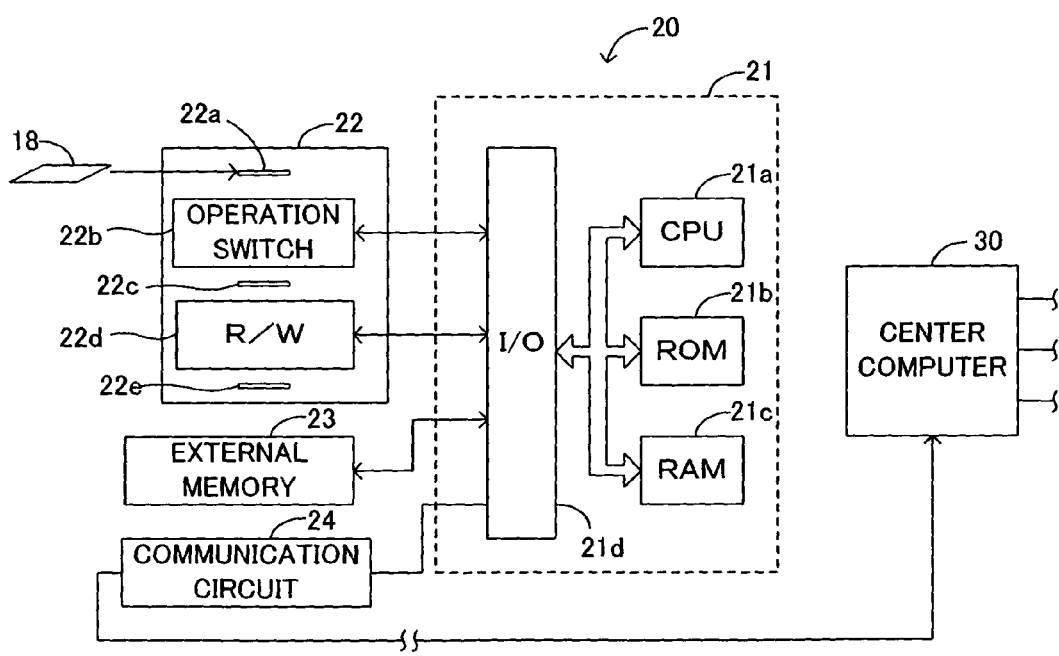
FIG. 3 is a block diagram showing the configuration of the card issuing machine shown in FIG. 1.

As shown in FIG. 3, the card issuing machine 20 is mainly composed of a microcomputer 21. The microcomputer 21 includes a CPU 21$a$, ROM 21$b$, RAM 21$c$, and an input/output interface 21$d$, which are connected with one another via a bus. The CPU 21$a$ executes a program (routine) stored in the ROM 21$b$, which will be described later, while using the data storage function of the RAM 21$c$.

The card issuing machine 20 includes a card issuance operation section 22, an external memory 23, and a communication circuit 24. The card issuance operation section 22 includes a holding section (holding means) 22$a$ for removably holding the prepaid card 18 attached thereto or inserted therein; an operation switch section 22$b$ to be operated by a user; a money placement opening 22$c$; a read/write section 22$d$ for reading necessary information, such as balance and charge record (which will be described later) from the inserted prepaid card 18 and for writing necessary information into the prepaid card 18; and a card issuance section 22$e$ for issuing a new card. Of these, the operation switch section 22$b$ and the read/write section 22$d$ are connected to the input/ output interface 21d in such a manner as to be able to exchange signals with the microcomputer 21.

The external memory 23 is composed of a hard disk drive, MO, etc. which is connected to the input/output interface 21d in order to enable exchange of signals with the microcomputer 21, and is adapted to supply necessary information (data, program, etc.) to the microcomputer 21 and stores necessary information in accordance with an instruction from the CPU 21a. The communication circuit 24 is connected to the input/output interface 21d of the microcomputer 21 and the center computer 30 in order to enable communication with the microcomputer 21 and the center computer 30.

Next, operation of the collected-charge distribution system having the above-described configuration will be described, starting from the case in which a prepaid card 18 having a sufficient balance and not having expired is inserted into the card holding means 17a of the read/write apparatus 17. Notably, it is assumed that the on-vehicle automatic charging apparatus 10 is not in an anomalous state.

Figure 4:
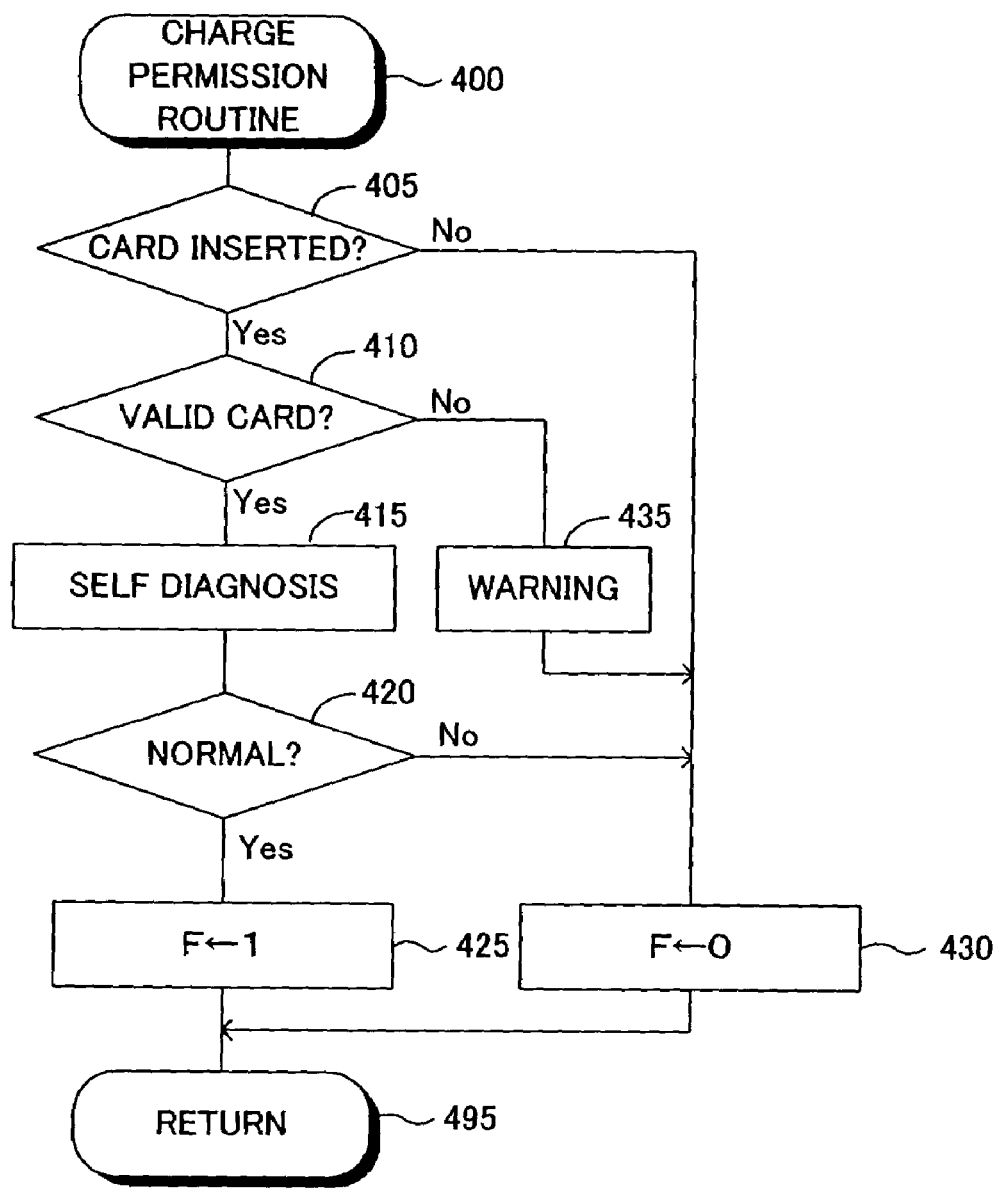
FIG. 4 is a flowchart showing a charge permission routine (program) executed by the CPU of the on-vehicle automatic charging apparatus shown in FIG. 1.

The CUP 11a of the on-vehicle automatic charging apparatus 10 repeatedly executes the charge permission routine shown in FIG. 4 every time a predetermined period of time elapses. Accordingly, when a predetermined timing has been reached, the CPU 11a starts the charge permission routine from step 400 thereof. After having proceeded to step 405, the CPU 11a determines whether the prepaid card 18 has been inserted into the card holding means 17a of the read/write apparatus 17.

In this case, since the prepaid card 18 has been inserted into the card holding means 17a, the result of the determination in step 405 becomes "Yes," and the CPU 11a proceeds to step 410 so as to determine whether the inserted prepaid card 18 is valid. The prepaid card 18 is determined to be valid when a sufficiently large balance remains and a valid term has not yet expired.

In this case, since the prepaid card 18 is valid, the result of the determination in step 410 becomes "Yes," and the CPU 11a proceeds to step 415 so as to perform self diagnosis by checking, for example, whether the RAM 11c functions properly and whether communication lines connected to the GPS apparatus 12, the ground-wave communication apparatus 13, etc. have been broken. Subsequently, the CPU 11a proceeds to step 420 so as to determine whether the result of the self diagnosis performed in step 415 indicates that the on-vehicle automatic charging apparatus 10 is normal.

In this case, since the on-vehicle automatic charging apparatus 10 is normal, the result of the determination in step 420 becomes "Yes," and the CPU 11a proceeds to step 425 so as to set the value of a flag F to "1." The flag is used to permit performance of charge processing when its value is "1" and prohibit performance of the charge processing when its value is "0." Subsequently, the CPU 11a proceeds to step 495 and ends the present routine.

When the prepaid card 18 has not yet been inserted into the card holding means 17a, the result of the determination in step 405 becomes "No," and the CPU 11a proceeds to step 430 so as to set the value of a flag F to "0" and then to step 495 so as to end the present routine. Further, when the inserted prepaid card 18 is not valid, the result of the determination in step 410 becomes "No," and the CPU 11a proceeds to step 435 so as to warn a user, via the display apparatus 14 and the sound apparatus 15, by way of providing a warning message indicating that "the card is invalid." Subsequently, the CPU 11a proceeds to step 430 so as to set the value of the flag F to "0" and then to step 495 so as to end the present routine.

When the on-vehicle automatic charging apparatus 10 is in an anomalous state, the result of the determination in step 420 becomes "No," and the CPU 11a proceeds to step 430 so as to set the value of the flag F to "0" and then to step 495 so as to end the present routine. In the above-described manner, the value of the flag F is set to "0" or "1."

Figure 5:
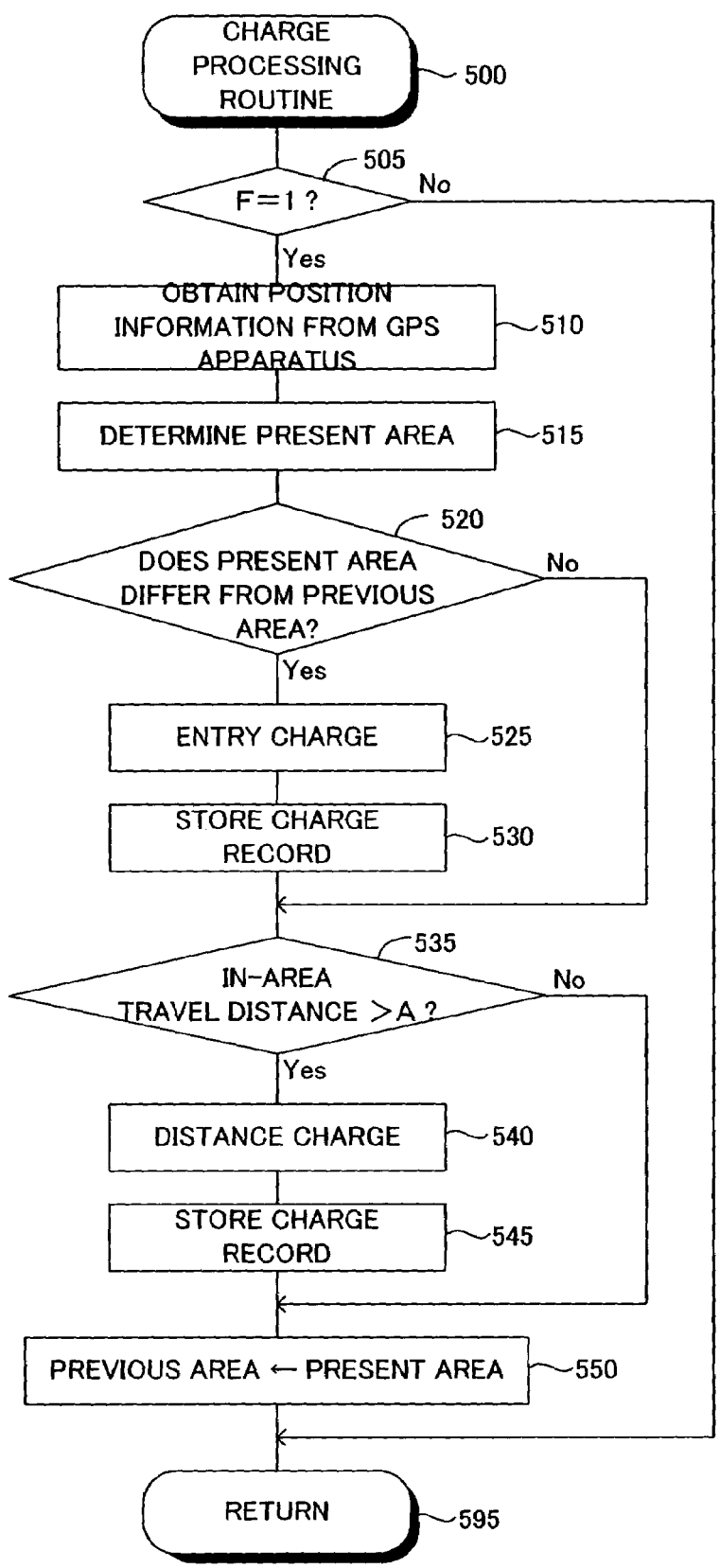
FIG. 5 is a flowchart showing a charge processing routine (program) executed by the CPU of the on-vehicle automatic charging apparatus shown in FIG. 1.

Next, charge processing will be described. The CPU 11a repeatedly executes the charge processing routine (serving as charge processing means) shown in FIG. 5 every time a predetermined period of time elapses. Accordingly, when a predetermined timing has been reached, the CPU 11a starts the charge processing routine from step 500 thereof. After having proceeded to step 505, the CPU 11a determines whether the value of the flag F is "1." When the value of the flag F is "1," the CPU 11a proceeds to step 510, and when the value of the flag F is "0," the CPU 11a proceeds directly to step 595 so as to end the present routine.

Therefore, when the value of the flag F becomes "1" as a result of execution of the charge permission routine, which has been described with reference to FIG. 4, the result of the determination in step 505 becomes "Yes," and the CPU 11a proceeds to step 510 so as to obtain position of the vehicle (vehicle position information) from the GPS apparatus 12.

Figure 6:
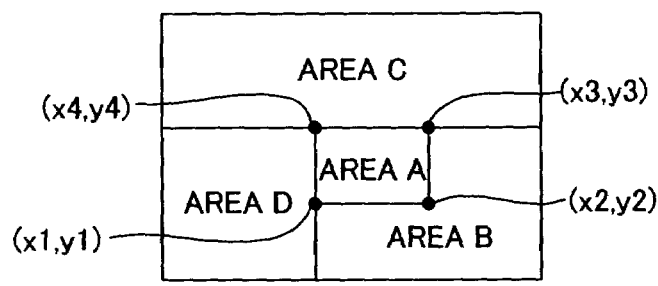
FIG. 6 is a diagram used for describing a method for specifying a charged area.

Subsequently, the CPU 11a proceeds to step 515 and determines a present area (charged area) in which the vehicle is present, from the present position information obtained from GPS 12 and information (area information) in relation to longitude x and latitude y which is stored in the external memory 16 and used for specifying each area. As shown in FIG. 6, each area is defined by means of a plurality of points, each specified by longitude x and latitude y. For example, area A is defined by four points having the following values of longitude x and latitude y: (x1, y1), (x2, y2), (x3, y3), and (x4, y4).

Next, after having proceeded to step 520, the CPU 11a determines whether the present area in which the vehicle is present differs from the area in which the vehicle was present when the present routine was last performed (see step 550, which will be described later).

When the vehicle has entered a new charged area as a result of traveling, the result of the determination in step 520 becomes "Yes," and the CPU 11a proceeds to step 525. In step 525, the CPU 11a performs entry charge processing on the basis of the fact that the vehicle has entered the new area. Specifically, the on-vehicle automatic charging apparatus 10 stores in the external memory 16 entry charge information shown in Table 1. The entry charge information includes a charge amount for each of combinations of information items, including entered area, time zone, and vehicle type (size; e.g., large, medium, compact). The CPU 11a determines a charge amount with reference to data corresponding to the information items at the present time and the corresponding charge information, subtracts the thus-determined charge amount from the balance read out from the prepaid card 18 to thereby obtain a new balance, and writes the new balance into the prepaid card 18.

TABLE 1

| Entered area | Time zone Type | 19:00-07:00 | 07:00-09:00 | 09:00-17:00 | 17:00-19:00 |
|---|---|---|---|---|---|
| Area A | Small | 100 yen | 200 yen | 100 yen | 100 yen |
|  | Medium | 150 yen | 300 yen | 150 yen | 150 yen |
|  | Large | 200 yen | 400 yen | 200 yen | 200 yen |
| Entered area | Time zone Type | 19:00-07:00 | 07:00-09:00 | 09:00-17:00 | 17:00-19:00 |
| Area B | Small | 150 yen | 200 yen | 100 yen | 100 yen |
|  | Medium | 150 yen | 300 yen | 200 yen | 150 yen |

TABLE 1-continued

| | Large | 200 yen | 400 yen | 200 yen | 150 yen |
|---|---|---|---|---|---|
| . | . | . | . | . | . |
| . | . | . | . | . | . |

Subsequently, the CPU 11a proceeds to step 530 so as to stores a charge record. As shown in Table 2, the charge record includes date and time (unit: sec) at which an entry fee is charged, vehicle position information (latitude, longitude), in-area travel distance, which is the total distance that the vehicle has traveled continuously within the same area, area, charge type, and vehicle type (large, medium, small). That is, the charge record includes information for specifying a charge amount and a managing company who must receive the charge. Further, charge record includes information which was used in the calculation of the charge amount.

TABLE 2

| M | D | Hr | Min | Sec | Position (longitude) | Position (latitude) | In-area Distance | Area | Charge | Vehicle |
|---|---|---|---|---|---|---|---|---|---|---|
| 08 | 30 | 14 | 01 | 00 | 135-30-00.00 | 35-00-00.00 | 0.0 m | A | Entry | Med. |
| 08 | 30 | 14 | 05 | 11 | 135-30-01.01 | 35-00-16.44 | 506.2 m | A | Distance | Med. |
| 08 | 30 | 14 | 10 | 25 | 135-30-01.52 | 35-00-32.28 | 1010.1 m | A | Distance | Med. |
| 08 | 30 | 14 | 15 | 26 | 135-30-01.27 | 35-00-35.12 | 0.0 m | B | Entry | Med. |
| 08 | 30 | 14 | 21 | 15 | 135-30-02.15 | 35-00-51.78 | 505.2 m | B | Distance | Med. |
| 08 | 30 | 14 | 30 | 37 | 135-30-02.13 | 35-01-08.11 | 1001.8 m | B | Distance | Med. |
| 08 | 30 | 14 | 36 | 47 | 135-30-02.22 | 35-01-10.05 | 0.0 m | C | Entry | Med. |
| 08 | 30 | 14 | 46 | 35 | 135-30-03.53 | 35-01-26.99 | 509.7 m | C | Distance | Med. |
| 08 | 30 | 14 | 53 | 13 | 135-30-03.12 | 35-01-43.05 | 1010.1 m | C | Distance | Med. |
| 08 | 30 | 15 | 00 | 56 | 135-30-03.25 | 35-01-58.77 | 1501.8 m | C | Distance | Med. |
| . | . | . | . | . | . | . | . | . | . | . |

Subsequently, the CPU 11a proceeds to step 535. The CPU 11a also proceeds directly to step 535, when the vehicle has not entered a new charged area at the time of performance of the above-described step 520, since the result of the determination in step 520 becomes "No,".

In step 535, the CPU 11a determines whether an in-area travel distance is greater than a predetermined reference value A. The in-area travel distance is calculated on the basis of the above-described vehicle position information by means of an unillustrated routine performed by the CPU 11a.

Accordingly, when the vehicle has traveled over a distance greater than the predetermined distance A within the same area, the result of the determination in step 535 becomes "Yes," and the CPU 11a proceeds to step 540. In step 540, the CPU 11a performs processing for charging in accordance with distance (distance charge). Specifically, the on-vehicle automatic charging apparatus 10 stores in the external memory 16 unit-distance charge information shown in Table 3. The unit-distance charge information includes a charge amount per unit distance for each of combinations of information items, including area (charged area) in which the vehicle is present, time zone, and vehicle type (size; e.g., large, medium, compact). The CPU 11a determines a charge amount with reference to data corresponding to the information items at the present time and the corresponding information for unit-distant charge, subtracts the thus-determined charge amount from the balance read out from the prepaid card 18 to thereby obtain a new balance, and writes the new balance into the prepaid card 18.

TABLE 3

| Information item | Contents of information | | | | | |
|---|---|---|---|---|---|---|
| Charged area | Area A | | | | | |
| Charge/0.5 km | Large | | Medium | | Small | |
| | First 0.5 km | After 0.5 km | First 0.5 km | After 0.5 km | First 0.5 km | After 0.5 km |
| Time zone: 07:00-09:00 | 500 yen | 450 yen | 300 yen | 250 yen | 200 yen | 150 yen |
| Time zone: 17:00-19:00 | 500 yen | 450 yen | 300 yen | 250 yen | 200 yen | 150 yen |
| Time zone: 19:00-07:00 | 400 yen | 350 yen | 200 yen | 100 yen | 100 yen | 50 yen |

Subsequently, the CPU 11a proceeds to step 545 so as to store a charge record as in the case of step 530, and then proceeds to step 550. When the vehicle has not traveled beyond the predetermined distance A within the same area at the time of execution of the above-described step 535, the result of the determination in step 535 becomes "No," and the CPU 11a proceeds direct to step 550. In step 550, the CPU 11a stores the present area determined in the above-described step 515, as a previous area to be used for calculation of the next time, and proceeds to step 595 so as to ends the present routine. In this manner, the charge processing is performed. Notably, the above-described steps 530 and 545 constitute distribution information write means for writing into the prepaid card 18, serving as a recording medium, distribution information (charge record) which is necessary for specifying the charge amount and a party (management company) to which fee corresponding to the charge amount is to be distributed.

Figure 7:
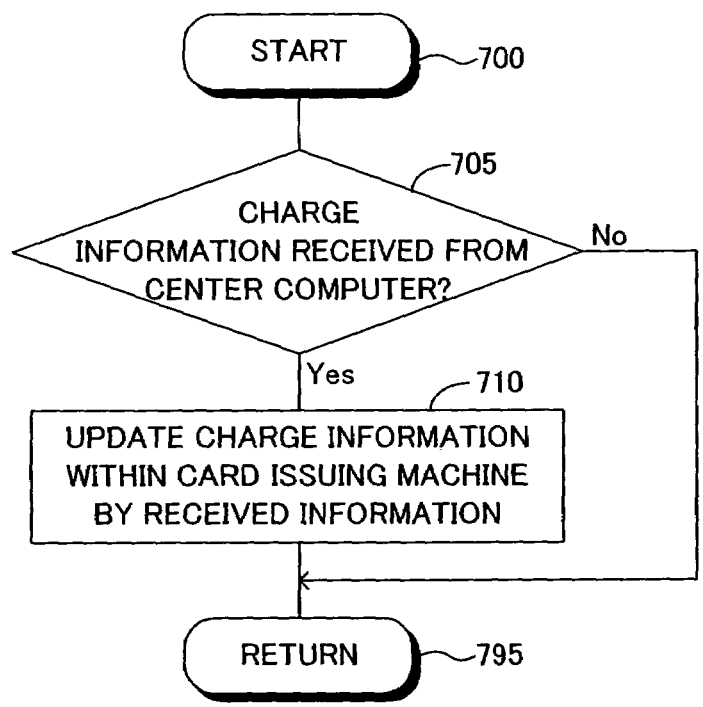
FIG. 7 is a flowchart showing a routine (program) executed by the CPU of the card issuing machine shown in FIG. 3.
Figure 8:
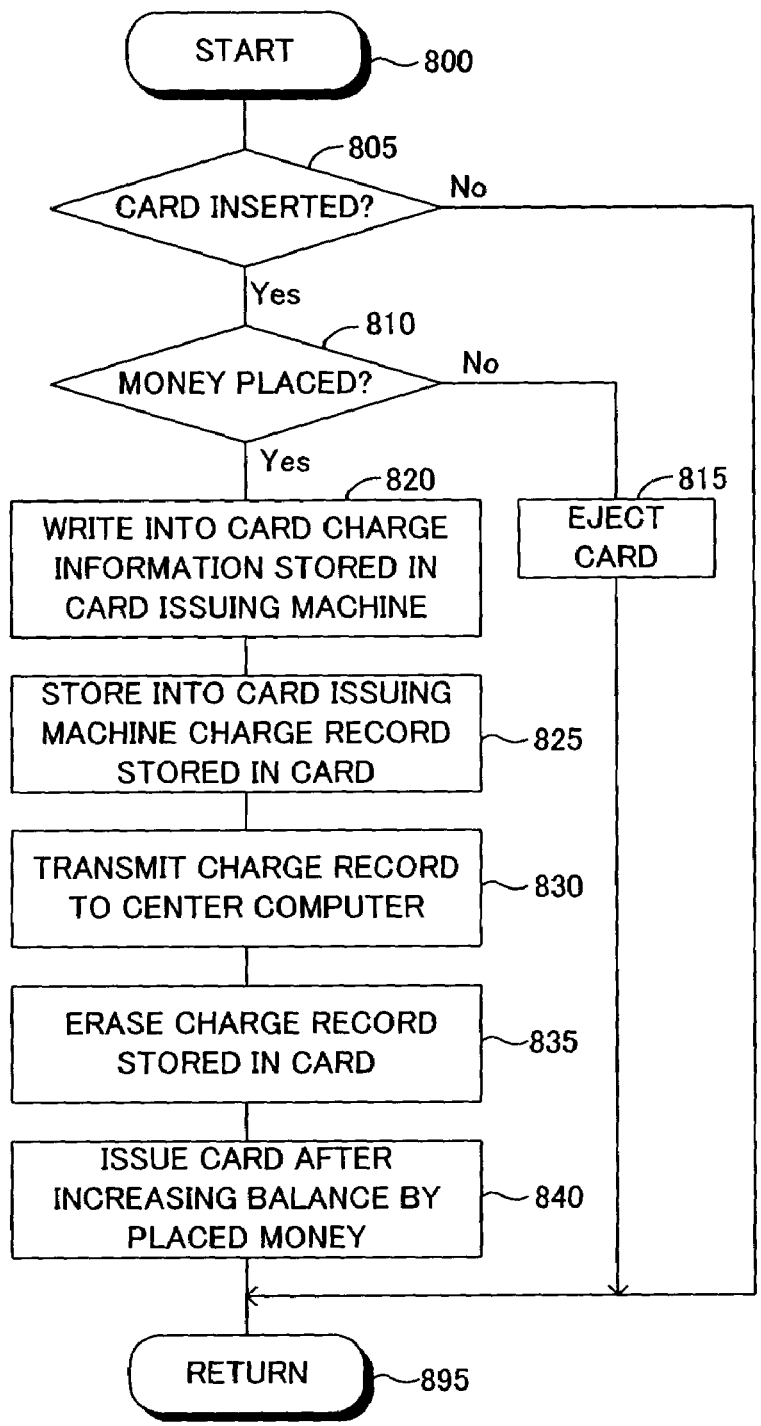
FIG. 8 is a flowchart showing another routine (program) executed by the CPU of the card issuing machine shown in FIG. 3.

Next, operation of the card issuing machine 20 will be described with reference to FIGS. 7 and 8. FIG. 7 shows a routine for updating the charge information stored in the card issuing machine 20 to the newest information. FIG. 8 shows a routine for updating the charge information stored in the prepaid card 18, transmitting the charge record stored in the prepaid card 18 to the center computer 30, and updating the balance of the prepaid card 18. The CPU 21a of the card issuing machine 20 performs these routines every time a predetermined period of time elapses.

Specifically, at a predetermined timing, the CPU 21a starts the processing of the routine of FIG. 7 from step 700 thereof. After having proceeded to the step 705, the CPU 21a determines whether charge information has been received from the center computer 30. Meanwhile, as will be described later, the center computer 30 is configured to transmit the newest charge information to the card issuing machine 20 at a proper timing (see FIG. 10). Therefore, when the newest charge information has been transmitted from the center computer 30, the result of the determination in step 705 becomes "Yes," and the CPU 21a proceeds to step 710 so as to update the charge information stored in the external memory 23 of the card issuing machine 20 on the basis of the received information and store the updated charge information in the external memory 23. Subsequently, the CPU 21a proceeds to step 795 and ends the present routine. When the newest charge information has not yet been transmitted from the center computer 30, the result of the determination in step 705 becomes "No," and the CPU 21a proceeds directly to step 795 and ends the present routine. In this way, the charge information stored in the card issuing machine 20 is updated to the newest information.

Further, the CPU 21a starts the processing of the routine of FIG. 8 from step 800 thereof at a predetermined timing. After having proceeded to step 805, the CPU 21a determines whether the prepaid card 18 has been inserted into the holding section 22a of the card issuing machine 20. When the prepaid card 18 has been inserted, the CPU 21a proceeds to step 810. When the prepaid card 18 has not yet been inserted, the CPU 21a proceeds to step 895 and ends the present routine. Further, the CPU 21a determines in step 810 whether money has been placed in the money placement opening 22c. When money has been placed, the CPU 21a proceeds to step 820. When money has not yet been placed, the CPU 21a proceeds to step 815 so as to eject the inserted prepaid card 18 and then proceeds to step 895 so as to end the present routine.

The description will be continued on the assumption that the prepaid card 18 has been inserted into the holding section 22a and money has been placed in the money placement opening 22c. Since the result of the determination in step 805 and the result of the determination in step 810 both become "Yes," the CPU 21a proceeds to step 820 and writes into the prepaid card 18 the newest charge information (i.e., the charge information updated in the above-described step 710) stored in the external memory 23. Subsequently, the CPU 21a proceeds to step 825 so as to read the above-described charge record (see Table 2) from the prepaid card 18 and stores the read charge record in the external memory 23. Notably, step 825 constitutes distribution information read-out means for reading the distribution information (charge record) from the prepaid card 18.

Subsequently, the CPU 21a proceeds to step 830 and transmits the charge record stored in the external memory 23 to the center computer 30. Thus, the center computer 30 becomes able to identify the time at which a fee has been charged, the area in which the fee has been charged, the type of the fee (charge type), and the type (large, medium, compact) of a vehicle to which the fee has been charged. Notably, the function of step 830 serves as transmission means for transmitting the distribution information to the center computer 30.

Next, the CPU 21a proceeds to step 835 so as to erase the charge record stored in the prepaid card 18 and then proceeds to step 840 so as to write into the prepaid card 18, as a new balance, the amount obtained through addition of the placed money to the balance stored in the prepaid card 18. Subsequently, the CPU 21a ejects the prepaid card 18 from the holding section 22a (issues an updated prepaid card). As described above, step 840 constitutes balance changing means for changing the balance of the prepaid card 18.

By means of the above-described processing, update of the charge information of the prepaid card 18, transmission of the charge record stored in the prepaid card 18 to the center computer 30, and update of the balance of the prepaid card 18 are accomplished.

Figure 9:
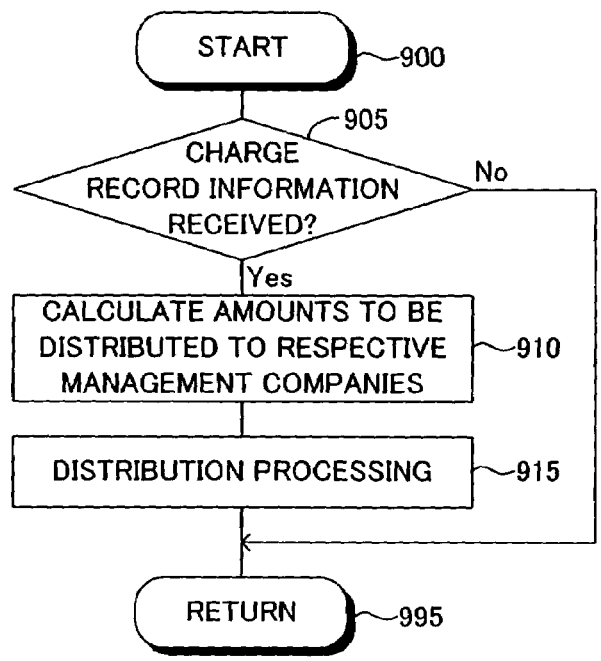
FIG. 9 is a flowchart showing a routine (program) executed by the center computer shown in FIG. 1.
Figure 10:
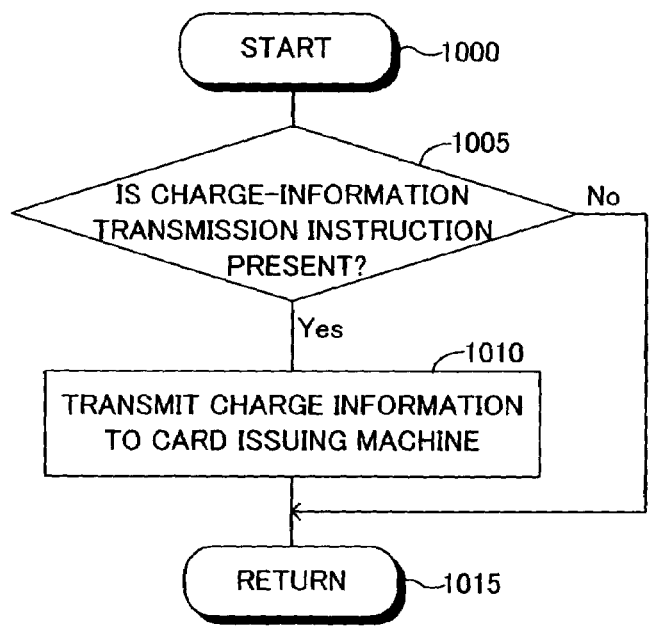
FIG. 10 is a flowchart showing another routine (program) executed by the center computer shown in FIG. 1.

Next, operation of the center computer 30 will be described with reference to FIGS. 9 and 10. FIG. 9 shows a routine for distributing to the respective management companies the charges collected by the card issuing machine 20. FIG. 10 shows a routine for transmitting the newest charge information to the card issuing machine 20. The center computer 30 performs these routines every time a predetermined period of time elapses.

Specifically, the center computer 30 starts the processing of the routine of FIG. 9 from step 900 thereof at a predetermined timing, and proceeds to step 905 so as to determine whether charge record information transmitted from the card issuing machine 20 has been received. When the charge record information has been received, the result of the determination in step 905 becomes "Yes," and the center computer 30 proceeds to step 910. When the charge record information has not yet been received, the center computer 30 proceeds to step 995 so as to end the present routine.

Here, the description will be continued on the assumption that the card issuing machine 20 has transmitted the charge record to the center computer 30 upon execution of the above-described step 830. In this case, the result of the determination in step 905 becomes "Yes," and the center computer 30 proceeds to step 910 so as to calculate, on the basis of the received charge record, amounts to be distributed to the management companies which manage the respective charged areas. In an example case in which the areas A, B, C, etc. are under management of the management companies A, B, C, etc., respectively, the totals of fees charged in each area serves as a distribution amount for the management company of the area.

Subsequently, the center computer 30 proceeds to step 915 in order to perform distribution processing for distributing the calculated distribution amounts to the computers of the respective management companies, and then proceeds to step 995 so as to end the present routine. Thus, the collected fees are distributed properly.

Further, the center computer 30 starts the processing of the routine of FIG. 10 from step 1000 thereof at a predetermined timing, and proceeds to step 1005 so as to monitor whether an operator's "instruction for transmitting updated charge information" is present. When, after updating the charge information of the center computer 30, the operator inputs an instruction for transmitting the updated charge information to the card issuing machine 20, the result of the determination in step 1005 becomes "Yes," and the center computer 30 proceeds to step 1010 so as to transmit the updated charge information (newest charge information) to the card issuing machine 20. Subsequently, in step 1015, the center computer 30 ends the present routine. In the above-described manner, the newest charge information is transmitted to the card issuing machine 20, and the charge information within the prepaid card 18 is updated when the card issuing machine 20 executes the above-described steps 710 and 820.

Figure 11:
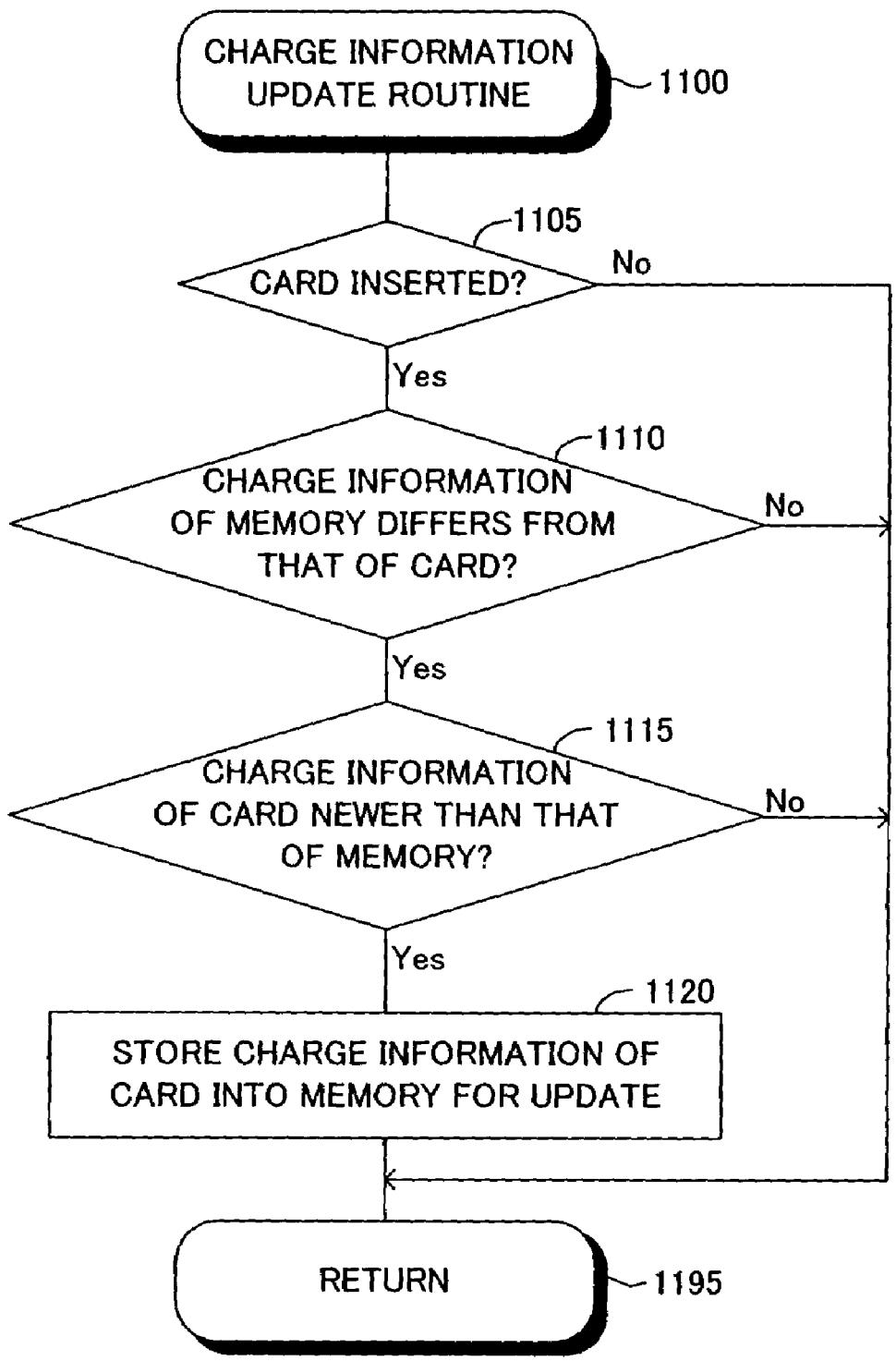
FIG. 11 is a flowchart showing a charge information update routine (program) executed by the CPU of the on-vehicle automatic charging apparatus shown in FIG. 1.

Next will be described operation of the on-vehicle automatic charging apparatus 10 at the time the charge information within the prepaid card 18, which has been updated in the above-described manner, is stored in the on-vehicle automatic charging apparatus 10. A description will be started after the point at which the prepaid card 18 having the newest information written thereinto has been inserted into the holding means 17a. The CPU 11a of the on-vehicle automatic charging apparatus 10 repeatedly executes the charge information update routine shown in FIG. 11 from step 1100 every time a predetermined period of time elapses, and in step 1105, determines whether the prepaid card 18 has been inserted into the holding means 17a. In this case, since the prepaid card 18 has been inserted, the result of the determination in step 1105 becomes "Yes," and the CPU 11a proceeds to step 1110 in order to determine whether the charge information stored in the external memory 16 differs from the charge information stored in the prepaid card 18.

In this case, since the charge information stored in the external memory 16 differs from the charge information stored in the prepaid card 18, the result of the determination in step 1110 becomes "Yes," and the CPU 11*a* proceeds to step 1115 in order to determine whether the charge information stored in the prepaid card 18 is newer than the charge information stored in the external memory 16.

In this case, since the charge information stored in the prepaid card 18 is newer than the charge information stored in the external memory 16, the result of the determination in step 1115 becomes "Yes," and the CPU 11*a* proceeds to step 1120 in order to update the charge information stored in the external memory 16 on the basis of the charge information stored in the prepaid card 18, stores the updated charge information into the external memory 16, and then proceeds to step 1195 so as to end the present routine.

When the prepaid card 18 has not been inserted, when the charge information stored in the external memory 16 is the same as that stored in the prepaid card 18, or when the charge information stored in the prepaid card 18 is not newer than that stored in the external memory 16, the result of the determination in step 1105, 1110, or 1115 becomes "No," and the CPU 11*a* proceeds to step 1195 so as to end the present routine. In the above-described manner, update of the charge information of the on-vehicle automatic charging apparatus 10 is accomplished.

As described above, in the present embodiment, the card issuing machine 20, which serves as a ground terminal apparatus, and the center computer 30 can obtain, via the prepaid card 18, a charge record which constitutes information that the on-vehicle automatic charging apparatus 10 used in order to calculate a charge amount (i.e., distribution information for specifying the charge amount and a party to which a fee corresponding to the charge amount must be distributed). Therefore, the charge amount (collected fees) can be distributed to a party (management company, public institution, etc.) which naturally must receive the fee.

Since the card issuing machine 20 is provided with the function for increasing the balance of the prepaid card 18 and the function for writing new charge information, the user must insert the prepaid card 18 into the card issuing machine 20. This guarantees that the card issuing machine 20 can have a chance to obtain the charge record.

The present invention is not limited to the above-described embodiment, and various modifications may be employed within the scope of the present invention. For example, instead of the prepaid card 18, an IC card, floppy disk, memory, or any other type of information-readable, writable recording medium can be used.

Although the card issuing machine 20 has both the function for increasing the balance of the prepaid card 18 and the function for writing charge information into the prepaid card 18, the card issuing machine 20 may be configured to have only one of these functions and may be an apparatus which has at least a function of reading charge records from the prepaid card 18. Although the card issuing machine 20 is connected to the center computer 30 by means of wire, the card issuing machine 20 and the center computer 30 may be configured to exchange information by means of radio.

The types of charge are not limited to the above-described entry charge and distance charge. For example, charging may be performed in accordance with time over which a vehicle stays within the same area. Alternatively, charging may be performed in such a manner that time charge is applied when a vehicle travels at a speed less than a predetermined speed, and the above-described distance charge is applied when the vehicle travels at a speed greater than the predetermined speed. Moreover, the system may be configured in such a manner that the center computer 30 transmits charge information by radio, and the on-vehicle automatic charging apparatus 10 receives the charge information via the ground-wave communication apparatus 13 of the on-vehicle automatic charging apparatus 10.

The invention claimed is:

1. A collected-charge distribution system for a vehicle which comprises an on-vehicle automatic charging apparatus mounted on a vehicle and a ground terminal apparatus disposed on the ground, and which is adapted to distribute charges collected through said on-vehicle automatic charging apparatus, wherein said on-vehicle automatic charging apparatus comprises:

first holding means for removably holding an information readable, writable recording medium having a balance recorded thereon;

charge processing means for calculating a charge amount to be charged to the vehicle on the basis of position information representing the position of the vehicle, reading the balance from the recording medium held by said first holding means, subtracting the calculated charge amount from the balance, and writing the subtracted balance into the recording medium; and charge record write means for writing into the recording medium a charge record, including information which said charge processing means used in order to calculate the charge amount, for specifying the charge amount and a party to which a fee corresponding to the charge amount is to be distributed, and wherein said ground terminal apparatus comprises:

second holding means for removably holding the recording medium; and charge record read-out means for reading out the charge record including the charge amount and the party to which a fee corresponding to the charge amount is to be distributed from the recording medium held by said second holding means.

2. The collected-charge distribution system according to claim 1, wherein the system includes a computer which is connected to a plurality of ground terminal apparatuses in a communicable manner; and each of the ground terminal apparatuses includes transmission means for transmitting to said computer the information read out from the recording medium.

3. The collected-charge distribution system according to claim 1, wherein said charge processing means of said on-vehicle automatic charging apparatus is configured to read out from the recording medium charge information used for determining the charge amount and determine the charge amount with reference to the charge information; and said ground terminal apparatus comprises charge information write means for writing the charge information into the recording medium held by said second holding means.

4. The collected-charge distribution system according to claim 1, wherein said ground terminal apparatus comprises balance changing means for changing the balance of the recording medium held by said holding means.

5. An on-vehicle automatic charging apparatus which is mounted on a vehicle and constitutes a collected-charge distributions system in cooperation with a ground terminal apparatus disposed on the ground, the ground terminal apparatus adapted to distribute charges collected through said on-vehicle automatic charging apparatus, said on-vehicle automatic charging apparatus comprising:

first holding means for removably holding an information readable, writable recording medium;

charge processing means for calculating a charge amount to be charged to the vehicle on the basis of position information representing the position of the vehicle, reading the balance from the recording medium first held by the holding means, subtracting the calculated charge amount from the balance, and writing the subtracted balance into the recording medium; and charge record write means for writing into the recording medium a charge record, including information which said charge processing means used in order to calculate the charge amount, for specifying the charge amount and a party to which a fee corresponding to the charge amount is to be distributed, wherein said ground terminal apparatus comprises:

second holding means for removably holding the recording medium; and charge record read-out means for reading out the charge record including the charge amount and the party to which a fee corresponding to the charge amount is to be distributed from the recording medium held by said second holding means.

6. A ground terminal apparatus which is disposed on the ground and cooperates with an on-vehicle automatic charging apparatus mounted on a vehicle so as to constitute a collected-charge distributions system for distributing charges collected through said on-vehicle automatic charging apparatus, said ground terminal comprising:

holding means for removably holding an information readable, writable recording medium having a balance recorded thereon, said on-vehicle automatic charging apparatus writing into the recording medium a new balance obtained through the subtraction from the balance of a charge amount calculated on the basis of position information representing the position of the vehicle, as well as information for specifying the calculated charge amount and a party to which a fee corresponding to the charge amount is to be distributed; and read-out means for reading out the information including the charge amount and the party to which a fee corresponding to the charge amount is to be distributed from the recording medium held by said holding means, wherein said on-vehicle automatic charging apparatus includes on vehicle holding means for removably holding the information readable, writable recording medium having the balance recorded thereon, charge processing means for calculating the charge amount to be charged to the vehicle on the basis of position information representing the position of the vehicle, reading the balance from the recording medium held by said on vehicle holding means, subtracting the calculated charge amount from the balance, and writing the subtracted balance into the recording medium, and charge record write means for writing into the recording medium a charge record, including information which said charge processing means used in order to calculate the charge amount, for specifying the charge amount and the party to which a fee corresponding to the charge amount is to be distributed.

7. The collected-charge distribution system according to claim 1, wherein the system includes a computer which is connected to a plurality of ground terminal apparatuses in a communicable manner; and each of the ground terminal apparatuses includes transmission means for transmitting to said computer the information read out from the recording medium.

8. The collected-charge distribution system according to claim 1, wherein said charge processing means of said on-vehicle automatic charging apparatus is configured to read out from the recording medium charge information used for determining the charge amount and determine the charge amount with reference to the charge information; and said ground terminal apparatus comprises charge information write means for writing the charge information into the recording medium held by said second holding means.

9. The collected-charge distribution system according to claim 2, wherein said charge processing means of said on-vehicle automatic charging apparatus is configured to read out from the recording medium charge information used for determining the charge amount and determine the charge amount with reference to the charge information; and said ground terminal apparatus comprises charge information write means for writing the charge information into the recording medium held by said second holding means.

10. The system according to claim 7, wherein said charge processing means of said on-vehicle automatic charging apparatus is configured to read out from the recording medium charge information used for determining the charge amount and determine the charge amount with reference to the charge information; and said ground terminal apparatus comprises charge information write means for writing the charge information into the recording medium held by said second holding means.

11. The collected-charge distribution system according to claim 1, wherein said ground terminal apparatus comprises balance changing means for changing the balance of the recording medium held by said second holding means.

12. The collected-charge distribution system according to claim 2, wherein said ground terminal apparatus comprises balance changing means for changing the balance of the recording medium held by said second holding means.

13. The system according to claim 7, wherein said ground terminal apparatus comprises balance changing means for changing the balance of the recording medium held by said second holding means.

14. The collected-charge distribution system according to claim 3, wherein said ground terminal apparatus comprises balance changing means for changing the balance of the recording medium held by said second holding means.

15. The collected-charge distribution system according to claim 9, wherein said ground terminal apparatus comprises balance changing means for changing the balance of the recording medium held by said second holding means.

16. The collected-charge distribution system according to claim 8, wherein said ground terminal apparatus comprises balance changing means for changing the balance of the recording medium held by said second holding means.

17. The system according to claim 10, wherein said ground terminal apparatus comprises balance changing means for changing the balance of the recording medium held by said second holding means.

18. The collected-charge distribution system according to claim 1, wherein the charge record includes information that specifies each of a plurality of parties that is to receive a fee and a charge amount corresponding to the fee.

* * * * *